(12) United States Patent
Pollitt et al.

(10) Patent No.: US 11,518,120 B2
(45) Date of Patent: Dec. 6, 2022

(54) FIBRE COATING APPARATUS

(71) Applicant: Crompton Technology Group Limited, Solihull (GB)

(72) Inventors: Will Pollitt, Kenilworth (GB); James William Bernard, Brackley (GB)

(73) Assignee: CROMPTON TECHNOLOGY GROUP LIMITED, Solihull (GB)

( * ) Notice: Subject to any disclaimer, the term of this patent is extended or adjusted under 35 U.S.C. 154(b) by 203 days.

(21) Appl. No.: 16/517,809

(22) Filed: Jul. 22, 2019

(65) Prior Publication Data
US 2020/0023595 A1    Jan. 23, 2020

(30) Foreign Application Priority Data
Jul. 23, 2018 (EP) .................................. 18275106

(51) Int. Cl.
    *B29C 70/50* (2006.01)
    *B29C 70/38* (2006.01)
    *B29B 15/12* (2006.01)

(52) U.S. Cl.
    CPC .......... B29C 70/504 (2013.01); B29C 70/382 (2013.01); B29B 15/122 (2013.01)

(58) Field of Classification Search
    CPC ....... B29B 15/10; B29B 15/12; B29B 15/122; B29B 15/14; B29C 70/32; B29C 70/34; B29C 70/38; B29C 70/382; B29C 70/384; B29C 70/386; B29C 70/388; B29C 70/504; B29C 70/52; B29C 70/521; B29C 70/523; B29C 70/525; B29C 70/526; B29C 70/528; C08J 5/24; D06B 1/14; D06B 1/141; D06B 1/16; D06M 15/55
    See application file for complete search history.

(56) References Cited

U.S. PATENT DOCUMENTS

| 3,844,822 | A | | 10/1974 | Boss et al. |
| 3,908,042 | A | * | 9/1975 | Heissler ................. B65H 49/18 427/172 |
| 4,495,017 | A | | 1/1985 | Abe et al. |

(Continued)

FOREIGN PATENT DOCUMENTS

| DE | 102006014142 A1 | 10/2007 |
| DE | 102017213493 A1 | 5/2018 |

(Continued)

OTHER PUBLICATIONS

Extended European Search Report for International Application No. 18275106.5 dated Jan. 22, 2019, 6 pages.

*Primary Examiner* — Michael A Tolin
(74) *Attorney, Agent, or Firm* — Cantor Colburn LLP

(57) ABSTRACT

An apparatus for applying a liquid matrix to a fiber tow includes a belt press arranged to receive the fiber tow and compress it between two moving belts and a matrix application roller arranged to receive liquid matrix and transfer it to the fiber. The apparatus also includes a second matrix application component arranged adjacent to the matrix application roller so as to form a first gap between the component and the matrix application roller. The matrix application roller is positioned adjacent to the belt press so as to form a second gap between the matrix application roller and a belt of the belt press; and wherein the second gap is larger than the first gap.

12 Claims, 4 Drawing Sheets

(56) References Cited

U.S. PATENT DOCUMENTS

| | | | |
|---|---|---|---|
| 4,597,818 A * | 7/1986 | Aoyama | B32B 27/32 |
| | | | 156/308.2 |
| 5,037,284 A | 8/1991 | Angell, Jr. et al. | |
| 5,330,595 A * | 7/1994 | Held | B29C 43/228 |
| | | | 156/64 |
| 6,743,392 B2 | 6/2004 | Tanaka et al. | |
| 6,814,829 B2 | 11/2004 | Pratt | |
| 2004/0238106 A1 | 12/2004 | Velleman | |
| 2011/0117231 A1* | 5/2011 | Klockow | B29C 70/545 |
| | | | 425/102 |
| 2012/0073726 A1 | 3/2012 | Koeniger et al. | |
| 2012/0251823 A1 | 10/2012 | Maldonado et al. | |
| 2018/0126599 A1* | 5/2018 | Park | B29B 11/16 |
| 2020/0247014 A1* | 8/2020 | Arcidiacono | B29C 70/506 |

FOREIGN PATENT DOCUMENTS

| | | |
|---|---|---|
| EP | 0027543 A1 | 4/1981 |
| EP | 0478258 A2 | 8/1981 |
| EP | 2324994 A1 | 5/2011 |
| JP | S56104042 A | 8/1981 |
| JP | S5912814 A | 1/1984 |

\* cited by examiner

FIBRE COATING APPARATUS

FOREIGN PRIORITY

This application claims priority to European Patent Application No. 18275106.5 filed Jul. 23, 2018, the entire contents of which is incorporated herein by reference.

TECHNICAL FIELD

This disclosure relates to an apparatus and method for coating fibers in a matrix. More particularly, the disclosure relates to forming a "prepreg" fiber product which is used to form fiber reinforced polymer (FRP) composite components. The prepreg fiber comprises reinforcing fibers such as glass, carbon, aramid or boron fibers coated with a matrix such as a thermoset or thermoplastic resin, typically an epoxy resin.

BACKGROUND

Prepreg fiber is expensive and is made using expensive consumables. Prepreg fiber is typically supplied as a reel, with the resin coated fibers attached to a removable backing sheet and wound onto a reel. In use, the fiber and backing sheet are drawn off the reel, the backing sheet is removed and the prepreg fiber is delivered to a fiber application apparatus such as a winding machine, an automated fiber placement (AFP) machine, pultrusion machine or the like. The term "prepreg" covers a number of different types of product, including towpreg, woven cloth and unidirectional tapes. A towpreg is a unidirectional fiber product with the fibers impregnated with resin. Towpregs are normally formed from one fiber bobbin (or a small number of bobbins) towed through a resin bath, usually using a solvent dip process (discussed below). Woven cloth prepregs have interwoven fibers at multiple angles and may be impregnated with resin using either a solvent dip process or a hot melt process (also discussed below). Prepreg tapes are formed from a wide sheet of unidirectional fiber which is then slit down into narrower tapes.

There are two main methods of forming prepreg tapes currently. The first is a solvent dip process. The resin is dissolved in a solvent bath and then the tow(s) or fabric is dipped in the resin solution. The coated resin is then dried in an oven to evaporate off the solvent. A major disadvantage of this process is that some residual solvent may remain in the prepreg product which can cause a volatile problem during cure, leading to high void content in the end product. This makes it unsuitable for high end applications such as aerospace applications. Also, the evaporation of chemicals can be hazardous and/or require expensive care and/or disposal as well as consuming a relatively large amount of energy.

The other process for forming prepreg tapes is a multi-stage process, generally referred to as a "hot melt" process. First a thin coating of resin is applied onto a paper substrate which is typically then wound onto a reel, chilled and stored until required. In the next stage, the resin film (still on the paper backing sheet) is unwound from the reel and brought into contact with fibers which are fed in from multiple bobbins. Although a single reel of resin/paper may be applied to one side of the fiber, it is common for two reels to be applied, one on each side of the fiber to sandwich the fiber in between two resin films. The resin and fiber are then heated to melt the resin, pressure is applied to impregnate the resin into the fibers and squeeze out any unwanted air and finally the impregnated resin is cooled so that the paper backing sheet can be removed. Protective sheets (e.g. a protective polythene protector and a silicone paper sheet) are then applied to one or both sides of the impregnated fiber tow and wound onto another reel which is chilled and stored.

Up to this point in the process, for efficiency of processing, wide sheets are typically employed, e.g. 600 mm or wider. However the end product is typically sold as half inch (12 mm), quarter inch (6 mm) or eighth inch (3 mm) tape and so the final processing step is to slit the wide sheet down into a number of thinner tapes. The impregnated fiber is unwound from the storage roller and passed through a slitting machine that cuts the wide sheet to form a large number of thinner tapes. A paper release sheet is applied to each tape as they are then individually wound onto their final reels for supply to the customer. A disadvantage of the cutting process is that it ends up cutting some of the fibers at the edge of each individual slit tape which slightly weakens the tape and the resulting product formed from that tape.

SUMMARY

According to this disclosure, there is provided an apparatus for applying a liquid matrix to a fiber tow, comprising: a belt press arranged to receive the fiber tow and compress it between two moving belts; a matrix application roller arranged to receive liquid matrix and transfer it to the fiber tow; a second matrix application component arranged adjacent to the matrix application roller so as to form a first gap between the component and the matrix application roller; wherein the matrix application roller is positioned adjacent to the belt press so as to form a second gap between the matrix application roller and a belt of the belt press; and wherein the second gap is larger than the first gap.

Positioning the matrix application roller adjacent to the belt press and carefully controlling the relative size of the first gap and the second gap controls the amount of liquid matrix material that is applied to the fiber and prevents excess matrix material from being transferred to the belt press. The first gap defines the thickness of a matrix layer that is formed on the matrix application roller. As the first gap is smaller than the second gap, that matrix layer can pass through the second gap without contacting the belt press. Instead, when fiber is drawn through the second gap, it entrains an amount of resin and only that resin that is entrained by the fiber is transferred (with the fiber) into the belt press. This amount of entrained resin defines the volume fraction (ratio of resin to fiber) of the end product. This arrangement reduces the number of steps compared with the usual hot melt process. As the matrix material is transferred with the fiber directly to the belt press without requiring any intermediate paper backing as a substrate, the number of process steps is reduced and the number of components reduced (no backing paper) and therefore the overall cost is reduced. Further, as the traditional process needs to chill (e.g. freeze) the intermediate resin film on the backing paper, and the process of the present disclosure does not require any such intermediate chilling, the new process also uses less energy, again saving cost. There is also no need for a further chilling stage that is normally required prior to slitting.

The matrix is preferably a viscous liquid that is sufficiently viscous (even when heated during this process, e.g. to a typical temperature of about 60 degrees centigrade) to form a layer of consistent thickness on the roller, i.e. so that the matrix does not run off the roller. A low viscosity matrix would typically be applied using a bath technique instead, but a typical low viscosity matrix has inferior mechanical properties (fracture toughness, strength & modulus) and hence is not suitable for many higher end, e.g. aerospace applications. The matrix preferably has a viscosity of at least 5000 cP, preferably at least 10000 cP, more preferably at least 20000 cP, at 60 degrees centigrade.

The first gap between the matrix application roller and the second matrix application component controls the amount of matrix material that is available to be transferred to the fiber tow by controlling the thickness of a matrix layer applied to the matrix application roller and thus limiting the amount of matrix material available for the fiber tow to pick up and entrain. However, other factors also affect the amount of material transferred to the tow, such as the quantity of fiber in the tow (including the thickness of the tow) and the relative speeds of the roller and the belt. The second matrix application component also ensures that a smooth and consistent thickness of matrix material is applied as a layer on the surface of the matrix application roller, ensuring a consistent application of matrix material across the width of the fiber tow.

The second gap between the matrix application roller and the belt of the belt press is larger than the first gap, but is preferably smaller than the sum of the thickness of the matrix layer on the matrix application roller and the thickness of the fiber tow. This ensures that when the fiber tow passes through the second gap, there is an overlap between the fiber tow and the matrix layer, thus forcing the matrix layer to be partially entrained in the fiber tow. As the second gap is larger than the thickness of the fiber tow, the matrix will desirably only be entrained in part of the thickness of the tow, not the full thickness. However, some matrix will desirably be accumulated on top of the fiber tow as part of the matrix uptake process. This extra matrix will then be compressed into the tow in the belt press. The size of the first gap, the size of the second gap and the relative speeds of the belt press and matrix application roller are all controlled so as to ensure that the desired amount of matrix is taken up by the fiber tow (and either held within the tow or accumulated on top of the tow) so that the desired volume fraction of the end product is accurately and consistently produced.

The matrix material may be a resin such as a thermoset or thermoplastic resin. The matrix material may be an epoxy matrix or may be other materials such as a phenolic matrix or a bismaleimide or polyimide matrix for example.

In use, the fiber passes through the second gap between the matrix application roller and the belt press before entering the belt press. The matrix material is transferred onto the fiber as it passes the matrix application roller and contacts the matrix layer on that roller. The fiber tow may either already be in contact with the belt or may come into contact with the belt as it passes through the second gap and is drawn into the belt press. The amount of matrix material available for uptake is well defined at the point of transfer. Further, any excess material that is not taken up by the fiber tow from the matrix application roller is simply retained by the matrix application roller and recirculates to be re-used rather than wasted. The excess material that is not entrained by the fiber is not transferred to the belt press. The fiber tow, together with the applied matrix material remains in contact with the belt of the belt press as it continues through into the belt press for compression.

The first gap and the second gap provide improved control compared with the multi-stage traditional prepreg forming process as these two gaps would normally have been part of the separated stages. In the traditional process, the thickness of matrix film on the paper backing (corresponding to the first gap discussed above) is defined in the first stage of the process before being chilled and stored, while the transfer of matrix to the fiber (corresponding to the second gap discussed above) is defined in the second stage of the process. Accordingly, the previous process does not allow for these gaps to be controlled together to make most efficient use of the liquid matrix material as it is supplied. In the process according to this disclosure, any liquid matrix material not transferred to the fiber tow in the second gap is recirculated back to the first gap to be used again. This allows a thicker layer of matrix material to be supplied from the first gap to the second gap, if desired, with the intention of oversupplying the matrix material, while not wasting any of that oversupply. This means that the setting of this gap size, and hence layer thickness does not need to be set with as accurate a tolerance as existing processes as a slight oversupply is acceptable and not wasteful.

It will be appreciated from the above description that the first gap is upstream of the second gap in the main flow direction of the matrix material (ignoring the recirculating flow), i.e. the matrix material is applied to the matrix application roller as a film by the first gap before the matrix material is then passed through the second gap and applied to the fiber.

While the matrix application roller and the belt press could be rotated together by the same control, it is preferred that they are independently controlled so that the speed and/or direction of the matrix application roller and the speed of the belts of the belt press can be independently controlled. Preferably the speed and/or direction of rotation of the matrix application roller is controlled so as to control the amount of matrix entrained by the fiber, thereby controlling the volume fraction of the end product. Regardless of whether the control of these components is independent or dependent, in some examples the matrix application roller is controlled such that its surface speed is different to the speed of the adjacent belt (and they may rotate in the same rotational sense so that their adjacent surfaces move in different directions). The fiber moves at the same speed as the belt press. Therefore the difference in speeds (and more particularly the different adjacent surface speeds) causes a shear or drag force between the matrix material on the matrix application roller and the fiber. Control of this force can affect the transfer of the film of matrix material on the matrix application roller to the fiber tow. It will be appreciated that the matrix application roller could rotate such that its surface moves in the same direction as that of the adjacent belt, or it could be arranged to counter-rotate so that its surface moves in the opposite direction to that of the adjacent belt within the second gap. This would greatly increase the shear force and increase the transfer of matrix material to the fiber.

It is preferred that the surface of the matrix application roller moves slower than the surface of the belt press in the second gap. Therefore the fiber effectively wipes the matrix off the matrix application roller which also stops strings of matrix forming.

As the second gap is larger than the first gap it can accommodate a thickness of impregnated fiber that is thicker than resin layer alone. Preferably the second gap is controlled to be larger than the maximum expected thickness of the impregnated tow.

The apparatus is preferably arranged to feed the fiber tow into the belt press without contacting the matrix application roller. As the second gap is larger than the thickness of the fiber tow, the fiber tow can be maintained in contact with the belt press and not in contact with the matrix application roller. This avoids any issues with trying to peel the fiber tow off the matrix application roller cleanly and avoids damage to the fiber tow (contact of the tow with the matrix application roller risks fibers being split from the main tow onto the roller which would create a mess).

The second matrix application component is preferably also a roller such that the first gap is formed between two rollers. However, in alternative examples, the second matrix application component could be a wiper blade that does not rotate, but still defines a gap between the blade and the matrix application roller. In examples in which the second matrix application component is a roller, while the two rollers could be rotated together by the same control, it is preferred that the two rollers are independently controlled so that the speed and/or direction of each roller can be independently controlled. Regardless of whether the control of the two rollers is independent or dependent, in some examples the two rollers are arranged to rotate at different speeds (and may even rotate in the same rotational sense so that their adjacent surfaces move in different directions). The difference in rotational speeds (and more particularly the different adjacent surface speeds) causes a shear force across the matrix material within the first gap. Control of this force can affect the properties of the film on the matrix application roller such as its thickness and uniformity.

The matrix application roller could be positioned adjacent to the belt of the belt press at any suitable location on the travel path of the belt, providing suitable support is provided behind the belt such that the second gap is well defined. However, it is preferred that the matrix application roller is positioned adjacent to a roller of the belt press. The roller of the belt press then provides the required support behind the belt such that the second gap is well defined. Also, as the roller is curved, the matrix application roller can be positioned without obstructing the other belt of the belt press. Further, where the fiber tow is arranged to pass through the second gap, the belt roller can also be used to provide and hold tension to the fiber tow before it passes through the gap.

The matrix application roller is preferably heated. Preferably the temperature is controlled so as to optimize the properties of the matrix material. Heating the matrix application roller controls the viscosity of the matrix material which in turn affects how easily it penetrates the gaps between fibers in the fiber tow. However, too high a temperature can also increase the tack of the matrix material and therefore hinder separation of the matrix material from the matrix application roller. The second matrix application component is preferably also heated. The matrix application components are preferably heated to at least 50 degrees centigrade. In some examples, they may be heated to at least 55 degrees centigrade or at least 60 degrees centigrade.

Preferably the belt press comprises a compression apparatus arranged to compress the fiber and matrix between the two belts. The compression apparatus helps to force the matrix material into the fiber tow, squeezing out any air gaps that would detract from the quality of the final part formed from the prepreg tow. The compression apparatus is preferably controlled either by controlling the amount of pressure applied to the belts or by controlling the width of a gap through which the belts pass The belt press may comprise a cooling zone located towards the end of the belt press, i.e. adjacent to the exit point of the fiber from the belt press. In the cooling zone, the combined fiber and matrix material are cooled so as to increase the viscosity and reduce the tack of the matrix material and thereby encourage clean separation of the fiber and matrix from the belts of the belt press. The cooling zone is preferably downstream (in the sense of the direction in which the fiber moves through the belt press) from the compression apparatus. Thus the belt press is effectively divided into a hot zone and a cold zone with the first part of the belt press being the hot zone in which matrix material is applied to the fiber tow and worked into the fiber tow, and the second part of the belt press being the cold zone in which the matrix material is hardened by the cooling so as to stick preferentially to the fiber rather than the belts.

As a whole, the process preferably avoids having to hot peel fiber and matrix off a roller or belt. Such hot peeling processes are typically not clean, leaving either fiber or matrix attached to the roller. As well as being messy, they adversely affect the control of the volume fraction. In the process according to this disclosure, the fiber and matrix are only peeled from the belt after cooling when the viscosity of the matrix has increased at which point it peels cleanly from the belt.

The belts of the belt press preferably have a non-stick surface for contact with the matrix. The non-stick surface may be a result of the choice of material for the belts or it may be a surface coating and/or surface finish applied to the belts. For example, in some preferred examples the belts are formed from polished stainless steel which has good release properties with respect to most typical matrix materials. The combination of material (stainless steel) and the surface finish (polishing) result in the majority of matrix material remaining in contact with the fiber tow. Any matrix material that remains stuck to the belt can either be allowed to remain on the belt press to be recirculated for maximum material efficiency, but preferably is scraped off (e.g. by a scraper) as the belt returns to the start of the belt press. In alternative examples the belts may be formed from a non-stick material such as PTFE or a non-stick coating such as PTFE may be applied to the belts to promote efficient release.

The cooling zone may comprise any suitable cooling apparatus to reduce the temperature of the fiber tow and the matrix. However in some preferred examples the cooling zone comprises one or more of: cold air jets, cooled rollers, and liquid nitrogen jets.

The apparatus may be arranged to coat any desired width of fiber tow. For example, the apparatus may be used to form sheets of fiber with a width of over 500 mm. Such sheets could later be slit (e.g. by a slitting device downstream of the belt press, or in a separate process at a later time) to divide a wide sheet into several narrower individual tapes. However, as such slitting tends to cut some of the fibers and thus results in product deterioration (it is preferred that as many as possible of the fibers in the tape remain continuous for maximum tensile strength), it is preferred to supply fiber tows to the belt press in one or more individual widths that are the desired widths of the end product. Such widths are typically an eighth of an inch (3 mm), a quarter of an inch (6 mm) or half an inch (12 mm), although any other width is also possible. Therefore the apparatus is preferably arranged to receive a plurality of separate fiber tows in parallel. As belt presses are normally supplied in a minimum width which is large enough to accommodate several such tows in parallel, the apparatus can conveniently process several such tows simultaneously while keeping the individual tows separate so that no cutting is required. It will be appreciated that while separate matrix application rollers (and other components) could be used, advantageously a single such roller (and single other components) can also be used for all parallel tows.

In the case of a single matrix application roller for the plurality of parallel tows, the application of matrix to the matrix application roller can be divided into a plurality of bands, one for each individual tow, thus further reducing wastage by only applying matrix to the roller where it may be taken up by the fiber tows. This may be achieved by providing one or more separators in contact with the matrix application roller within the first gap. The or each separator holds back matrix material as it is applied to the matrix application roller and prevents the matrix from coating the matrix application roller in a circumferential band at the location of the separator, while allowing matrix to coat the roller in circumferential bands either side of the separator. A plurality of such separators may be provided to divide the apparatus into a plurality of separate parallel tows each provided with its own resin application band. In examples where the second matrix application component is a roller, the separators are preferably provided as one or more separate components. In examples where the second matrix application component is a blade, the blade may form the separators.

Where multiple tows are processed simultaneously, they may be wound up on separate, individual reels downstream of the belt press, thus simultaneously producing multiple reels of finished towpreg fiber.

As an alternative to winding the towpreg fiber onto reels for later use, the apparatus can form part of a larger apparatus supplying newly formed towpreg fiber directly to a fiber placement machine for immediate use in the formation of a composite part, e.g. by depositing, winding or laying the fiber onto a substrate.

Thus, according to another aspect of this disclosure, there is provided a fiber placement apparatus comprising: an apparatus as described above, optionally including any of the optional features discussed above; and a fiber placement machine arranged to receive one or more fiber tows from said apparatus and to apply said fiber tow onto a substrate.

Any suitable fiber placement machine may be used, including for example a filament winding machine, automated fiber placement (AFP) machine, pultrusion machine, etc. Such machines may be arranged to deposit the fiber tow (or multiple such parallel tows) onto one or more mandrels, mould parts or existing composite parts (referred to in general as substrates).

This disclosure further extends to a method of applying a liquid matrix to a fiber tow, comprising: applying a liquid matrix to a matrix application roller; controlling the amount of matrix applied to the matrix application roller by passing the matrix on the matrix application roller through a first gap formed between the matrix application roller and a second matrix application component; transferring the liquid matrix from the matrix application roller to the fiber tow by passing the fiber through a second gap formed between the matrix application roller and a belt press; and receiving the fiber tow in the belt press and compressing the fiber tow between two belts of the belt press; wherein the second gap is larger than the first gap.

All of the preferred features described above also apply equally to this method.

BRIEF DESCRIPTION OF DRAWINGS

One or more non-limiting examples will now be described, by way of example only, and with reference to the accompanying figures in which.

DETAILED DESCRIPTION

Figure 1:
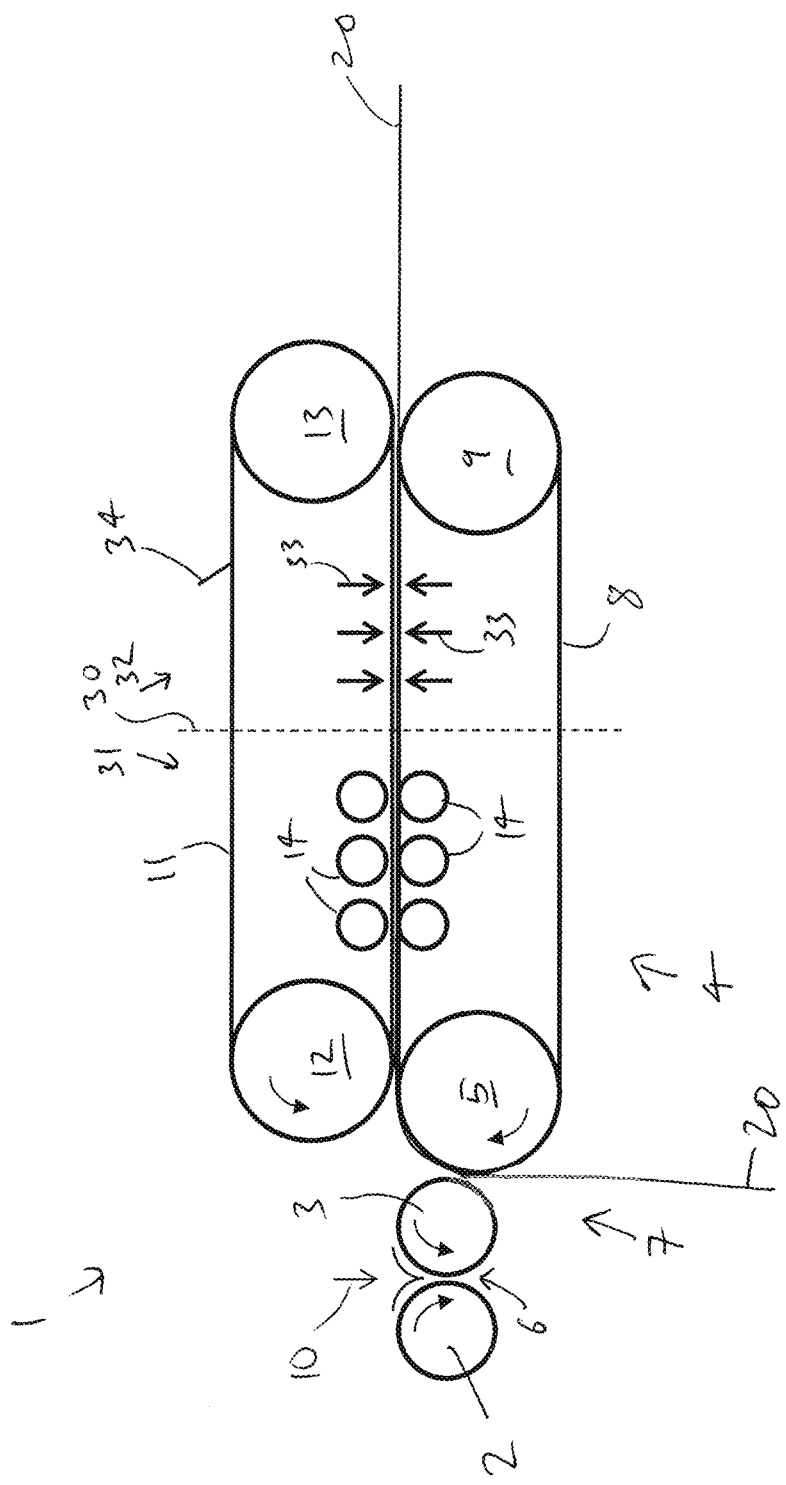
FIG. 1 shows a side view of a first example of a towpreg apparatus.

FIG. 1 shows a towpreg apparatus 1 which includes a first matrix application roller 2 and a second matrix application roller 3. The second matrix application roller 3 is provided adjacent to a belt press 4. A first gap 6 is formed between the first matrix application roller 2 and the second matrix application roller 3. A second gap 7 is formed between the second matrix application roller 3 and the belt press 4 (specifically the belt press roller 5).

Resin (matrix) is applied (as shown by arrow 10) to a first gap 6 formed between matrix application rollers 2 and 3. This can be in the form of a frozen resin brick to be melted by the rollers 2, 3 or as a liquid resin feed. First gap 6 forms a thin layer of resin on the surface of matrix application roller 3 which rotates anti-clockwise in this example, carrying the resin layer round towards fiber 20 and second gap 7 formed between matrix application roller 3 and belt press roller 5. The resin is then transferred to the fiber 20 at the gap 7. Fiber 20 is then carried on a bottom belt 8 running around belt press rollers 5 and 9 and is compressed by a top belt 11 running around rollers 12 and 13. Within the belt press 4, pressure is applied to the back of the belts 8, 11 via rollers 14 in a hot area 31 of the belt press (to the left of notional divider line 30) to consolidate the resin into the fiber. The belts 8, 11 and the fiber 20 then pass into the cold area 32 (to the right of notional diver line 30) where the fiber 20 is chilled to promote clean release from the belts. The fiber 20 can then be fed onto a bobbin (not shown) with poly backing or fiber 20 can be fed directly into a winding machine for immediate use.

It will be appreciated that the hot area 31 and cold area 32 could be physically separated by a barrier, but this is not necessary. The hot area 31 comprises one or more heated components. In this example, matrix application rollers 2, 3 are heated so as to melt the resin. Belt press rollers 5, 12 and/or compression rollers 14 could be heated, but this is not normally necessary. Compression rollers 14 act to press the belts 8, 11 together with the fiber tow 20 between them, thereby squeezing the resin into the gaps between individual fibers and voiding any air from within the tow 20. The pressure provided by rollers 14 may be carefully controlled to ensure optimal product characteristics. As an alternative, instead of controlling pressure, the gap between rollers 14 may be carefully controlled.

As the resin coated fiber 20 passes through the belt press 4 it cools naturally. In cold area 32, active cooling takes place as indicated by arrows 33 which may be cooling air jets, liquid nitrogen jets, cooling rollers or cooling plates applied to the back side of belts 8, 11. This active cooling ensures that the resin cools to a lower viscosity state in which it preferentially sticks to the fiber 20 rather than the belts 8, 11. Therefore as the fiber 20 exits the apparatus 1 at the right hand side (in FIG. 1), little or no resin sticks to the belts 8, 11 of the belt press 4. In case some resin may remain on the belts 8, 11, scrapers 34 may be provided to remove it on the return path (only one scraper is shown in FIG. 1 on belt 11, but one could equally be provided on belt 8).

As shown in FIG. 1, first gap 6 is smaller than second gap 7. This ensures that resin from the matrix application roller 3 does not get transferred to the belt press 4 other than by the fiber 20. Therefore no excess resin is carried across to the belt press 4, but instead is returned on roller 3 back to the main resin reservoir where it can be re-used. Second gap 7 is not only larger than first gap 6, but is also large enough to accommodate the full thickness of fiber 20 carrying its full amount of entrained resin. Again, this ensures that the full amount of resin entrained by fiber 20 is carried through to belt press 4 with no excess. Thus the resin uptake can be accurately controlled with minimum wastage.

The amount of resin entrained by fiber 20 as it passes matrix application roller 3 is determined by the relative speed of the fiber 20 and the roller 3. Thus the fiber 20 and roller 3 may move at different speeds. For example if the fiber 20 moves faster than the surface of roller 3 then the fiber drags through the resin layer on roller 3, increasing the amount of resin entrained on fiber tow 20. By carefully controlling the relative speeds of the fiber 20 and roller 3, the amount of resin uptake and therefore the volume fraction of the end product can be carefully and accurately controlled. The speed of the fiber 20 is determined by the speed of the belt press 4 (they move at the same speed as the belt press 4 draws the fiber 20 through it) and therefore to achieve accurate relative speed control, the roller 3 and the belt press 4 are independently controlled (meaning that the speed of each can be set independent of the other).

Figure 2:
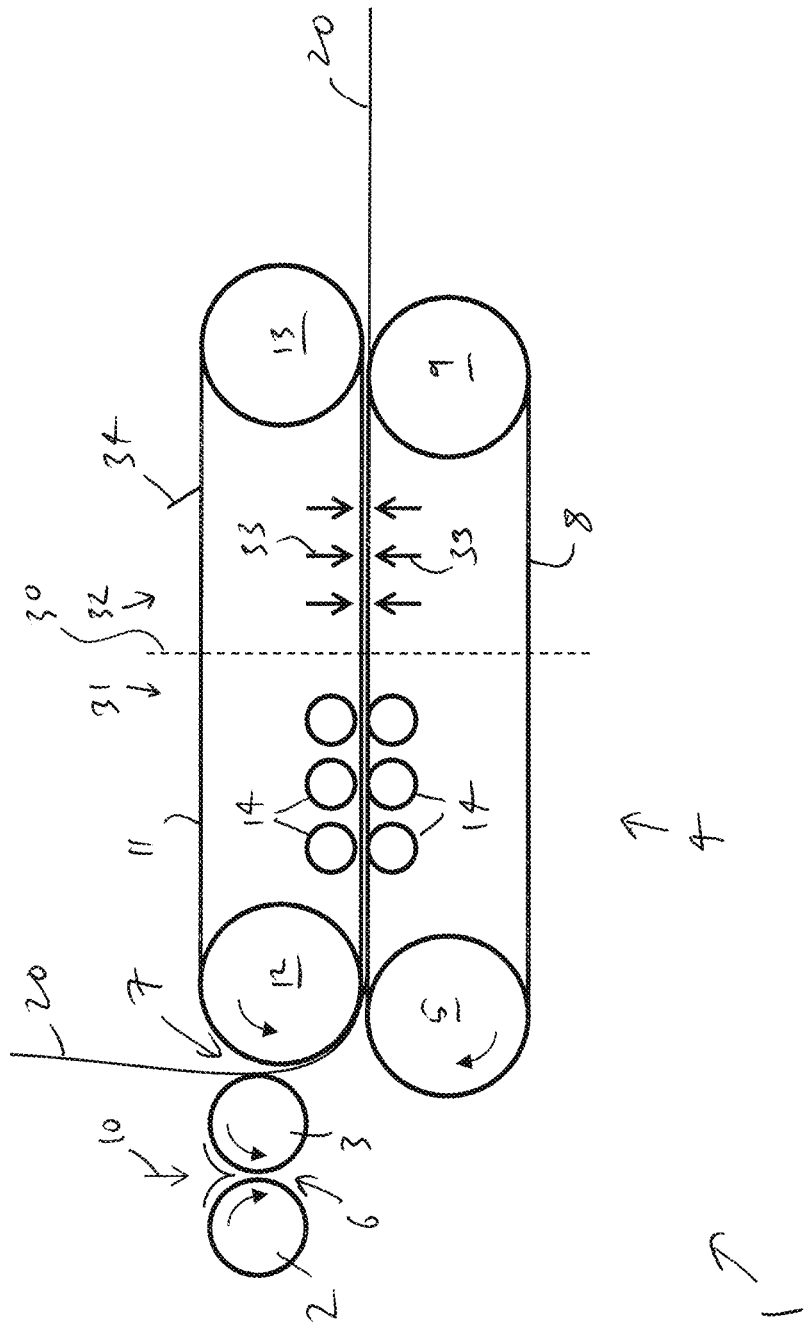
FIG. 2 shows a side view of a second example of a towpreg apparatus.

FIG. 2 shows a variant of FIG. 1. The main difference between these two examples is that in FIG. 1 the matrix application roller 3 and the adjacent belt press roller 5 rotate in opposite directions. Although the roller 3 may be controlled to move slower (or possibly faster) than belt press roller 5, they still rotate in opposite senses (one clockwise and one anti-clockwise). This arrangement may be considered a "forward roll" arrangement where the fiber contact surfaces of both rollers 3, 5 move in the same direction as the fiber 20. In FIG. 2, the matrix application roller 3 rotates in the same sense as the adjacent belt press roller 12 (both rotate anti-clockwise in this example). This arrangement may be considered a "reverse roll" arrangement. Thus the fiber contact surface of roller 3 moves in the opposite direction to the fiber 20, creating a high shear force between the fiber 20 and the matrix layer on the surface of roller 3. This increases the amount of resin applied to the fiber 20. As with the first example, the rollers 3, 12 are still independently controlled so that the relative speed can be controlled and therefore the amount of resin uptake can still be controlled accurately. All other features of the second example are the same as the first example with the exception of the feed direction of the fiber 20 (from above rather than from below).

In a variation of the first and second examples, the first matrix application roller 2 may be replaced with a wiper blade which serves to define the gap 6 and thus the thickness of the layer of matrix on the surface of roller 3. The use of a roller 2 is preferred as it allows further control by controlling the relative rotation speeds of rollers 2 and 3 which affects the smoothness of the layer of matrix applied to the surface of roller 3. Therefore rollers 2 and 3 are also independently controlled (meaning that their speeds can be controlled independently).

The belts 8, 11 of belt press 4 may be made from polished stainless steel or in other examples they may be coated with a permanent release coating so as to provide a non-stick surface to which the resin does not adhere. The resin then preferentially adheres to the fiber 20, thereby ensuring that the volume fraction of the towpreg output from the apparatus 1 is substantially the same as was defined by the application set up at the entrance to the belt press 4. Rollers 2 and 3 are provided with a chrome coating or other hardwearing surface with a fine finish so that they provide a smooth matrix layer on the surface of roller 3.

Figure 3:
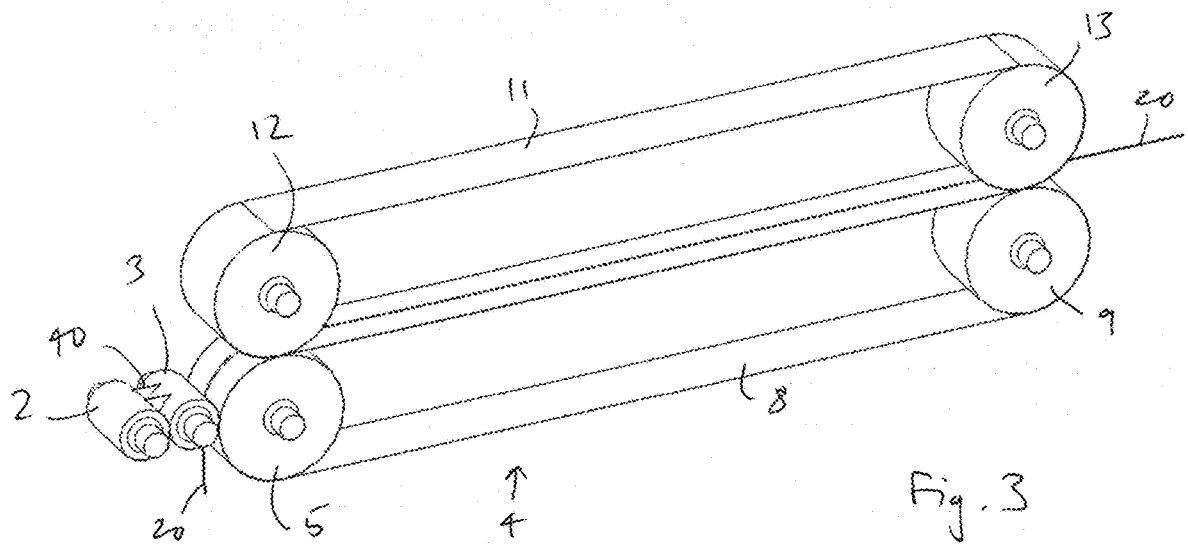
FIG. 3 shows a perspective view of the first example.
Figure 4:
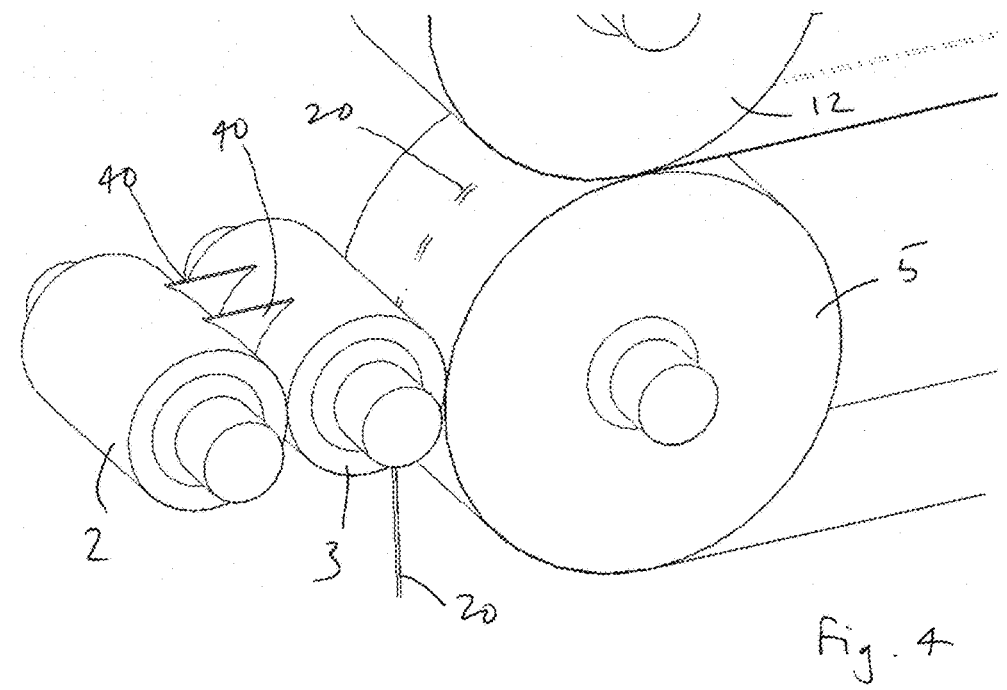
FIG. 4 shows a close up perspective of FIG. 3.

FIG. 3 is a perspective view of the example of FIG. 1, showing the main (but not all) features shown in FIG. 1. In addition, FIG. 3 shows a pair of separators 40 which delimit a band of resin on matrix application roller 3. This arrangement is shown enlarged in FIG. 4.

The separators 40 define a channel into which the resin is supplied and which delimit the width of the rollers 2, 3 across which resin is in contact. As the rollers 2, 3 rotate, the resin therefore forms a thin layer (with the thickness defined by gap 6 as discussed above) in a circumferential band around roller 3 which is less than the full width (full axial extent) of roller 3. By selecting this width (i.e. selecting the locations of separators 40) to correspond to the width of the fiber tow 20 (or preferably slightly larger than the tow 20 to provide a small tolerance), the amount of resin used is limited to the width of fiber 20 which reduces the resin usage and thus wastage.

This arrangement of separators 40 is particularly advantageous when the belt press 4 is much wider than a single tow 20 and when several tows 20 are processed in parallel on the same belt press 4. Each pair of separators 40 defines one band of resin for one tow. Therefore multiple pairs of separators 40 can be positioned to define several adjacent, but axially separated, bands of resin on matrix application roller 3, each band corresponding to a different parallel tow 20. As each parallel tow 20 is formed separately, there is no need for slitting downstream of the belt press 4 to divide the tows 20. Instead, they are already separated and can be immediately wound directly onto reels for storage without further intermediate processing.

Figure 5:
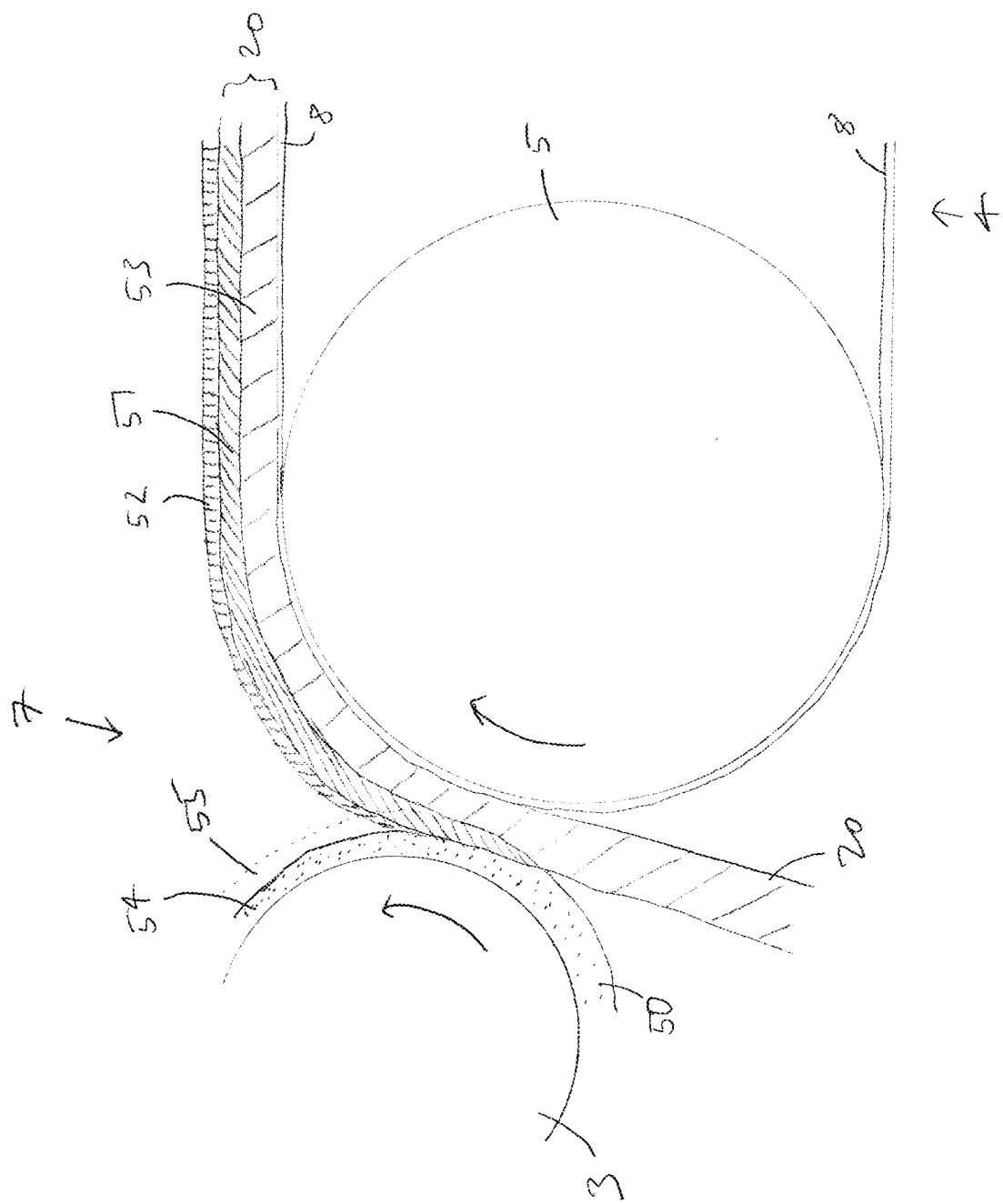
FIG. 5 shows a close up of the second gap.

FIG. 5 shows the second gap, between the matrix application roller 3 and the belt 8 and belt press roller 5 of the belt press 4. The fiber tow 20 is shown entering the second gap 7 from below and being pulled round into the belt press 4 on belt 8 by the clockwise rotation of belt press roller 5. The matrix application roller rotates anti-clockwise and is shown having a full thickness layer 50 of matrix formed on the surface thereof as it approaches the gap 7 and contact with the fiber tow 20. As the second gap 7 is smaller than the sum of the thickness of layer 50 and the thickness of tow 20, there is an overlap between the resin layer 50 and the tow 20 in the gap 7. Thus the resin layer 50 is squeezed partially into the tow 20 in the gap 7 so as to partially impregnate the tow 20. This partially impregnated portion of the tow is labelled 51 in FIG. 5, with the non-impregnated portion of tow 20 being labelled 53. The thickness of resin layer 50 is reduced on the other side of the gap 7 as it exits the gap 7 due to the amount of resin taken up by the fiber tow 20. The reduced thickness layer of resin on matrix application roller 3 is labelled 54 and the missing portion from the original thickness 50 is shown at 55 by dashed line. In addition to the tow 20 being partially impregnated with resin in layer 51, an additional layer of resin 52 is formed on top of the fiber tow 20. This resin layer 52 will be fully compressed into the tow 20 within the belt press, thereby reducing the volume fraction of the end product without any risk of damage to the tow 20.

As can be seen in FIG. 5, the tow 20 does not come into contact with matrix application roller 3 as it passes through gap 7, thereby avoiding the risk of damage to the tow by fibers becoming attached to roller 3, split off from the main tow 20 and carried with the roller 3.

The invention claimed is:

1. An apparatus for applying a liquid matrix to a fibre tow, comprising:
   a belt press comprising two moving belts, the belt press being arranged to receive the fibre tow and compress it between the two moving belts;
   a matrix application roller arranged to receive liquid matrix and transfer it to the fibre tow;
   a second matrix application component arranged adjacent to the matrix application roller so as to form a first gap between the second matrix application component and the matrix application roller;
   wherein the matrix application roller is positioned adjacent to the belt press so as to form a second gap between the matrix application roller and a belt of the belt press; and
   wherein the second gap is larger than the first gap.

2. An apparatus as claimed in claim 1, wherein a speed of the belt press and a speed of the matrix application roller are independently controlled.

3. An apparatus as claimed in claim 1, wherein the matrix application roller is controlled such that a surface speed of the matrix application roller is different to a speed of the belt press.

4. An apparatus as claimed in claim 1, wherein the second matrix application component is a roller.

5. An apparatus as claimed in claim 1, wherein the matrix application roller is positioned adjacent to a roller of the belt press.

6. An apparatus as claimed in claim 1, wherein the apparatus is arranged to feed the fiber tow into the belt press without contacting the matrix application roller.

7. An apparatus as claimed in claim 1, wherein the matrix application roller is heated.

8. An apparatus as claimed in claim 1, wherein the belt press comprises a compression apparatus arranged to compress the fibre tow and liquid matrix between the two moving belts.

9. An apparatus as claimed in claim 1, wherein the two moving belts of the belt press have a non-stick surface for contact with the liquid matrix.

10. An apparatus as claimed in claim 1, wherein the apparatus is arranged to receive a plurality of separate fiber tows in parallel.

11. A fibre placement apparatus comprising:
    an apparatus as claimed in claim 1; and
    a fibre placement machine arranged to receive one or more fibre tows from said apparatus and to apply the one or more fibre tows onto a substrate.

12. An apparatus for applying a liquid matrix to a fibre tow, comprising:
    a belt press comprising two moving belts, the belt press being arranged to receive the fibre tow and compress it between the two moving belts;
    a matrix application roller arranged to receive liquid matrix and transfer it to the fibre tow;
    a second matrix application component arranged adjacent to the matrix application roller so as to form a first gap between the second matrix application component and the matrix application roller;
    wherein the matrix application roller is positioned adjacent to the belt press so as to form a second gap between the matrix application roller and a belt of the belt press;
    wherein the second gap is larger than the first gap; and
    wherein the second matrix application component is a blade.

* * * * *